(12) United States Patent
Fang

(10) Patent No.: US 12,523,248 B2
(45) Date of Patent: Jan. 13, 2026

(54) MULTI-MOUNT ASSEMBLY AND ELECTRONIC APPARATUS

(71) Applicant: GEMTEK TECHNOLOGY CO., LTD., Hsinchu County (TW)

(72) Inventor: Min-Yao Fang, Hsinchu County (TW)

(73) Assignee: GEMTEK TECHNOLOGY CO., LTD., Hsinchu County (TW)

( * ) Notice: Subject to any disclaimer, the term of this patent is extended or adjusted under 35 U.S.C. 154(b) by 609 days.

(21) Appl. No.: 17/938,675

(22) Filed: Oct. 7, 2022

(65) Prior Publication Data

US 2023/0366425 A1 Nov. 16, 2023

Related U.S. Application Data

(60) Provisional application No. 63/364,498, filed on May 11, 2022.

(51) Int. Cl.
| | |
|---|---|
| *F16B 21/06* | (2006.01) |
| *F16B 2/08* | (2006.01) |
| *F16B 4/00* | (2006.01) |
| *H05K 5/02* | (2006.01) |

(52) U.S. Cl.
CPC .............. *F16B 21/065* (2013.01); *F16B 2/08* (2013.01); *F16B 4/004* (2013.01); *H05K 5/0204* (2013.01); *H05K 5/0217* (2013.01)

(58) Field of Classification Search
CPC .................................................. F16B 5/0036
See application file for complete search history.

(56) References Cited

U.S. PATENT DOCUMENTS

| | | | |
|---|---|---|---|
| 5,392,350 A * | 2/1995 | Swanson ................. | B60R 11/02 379/426 |
| 5,730,406 A * | 3/1998 | Chen ..................... | G06F 1/1601 248/221.11 |
| 6,988,697 B2 * | 1/2006 | Ware ...................... | H02G 3/105 24/20 R |
| 7,997,546 B1 * | 8/2011 | Andersen ................. | F16B 2/06 248/230.8 |
| 8,020,821 B2 * | 9/2011 | Chen ..................... | F16M 13/02 248/221.11 |
| 9,657,896 B2 * | 5/2017 | Zhai ....................... | F16M 11/16 |
| 10,576,316 B1 * | 3/2020 | Kulick .................... | F16B 21/14 |

(Continued)

FOREIGN PATENT DOCUMENTS

| | | | | |
|---|---|---|---|---|
| GB | 2589923 A * | 6/2021 | ............. | E01F 15/00 |
| WO | WO-9323943 A1 * | 11/1993 | ............. | B60R 11/02 |

*Primary Examiner* — Matthew R Mcmahon
(74) *Attorney, Agent, or Firm* — CKC & Partners Co., LLC

(57) ABSTRACT

A multi-mount assembly disposed on a fastening structure that has a U-type rail is provided. The multi-mount assembly includes a main body having a quadrilateral rail, a positioning hole, and a passage. The quadrilateral rail is disposed along a periphery of the main body. The positioning hole is in a side of the main body facing away from the fastening structure. The passage is spatially communicated with a first edge and a second edge of the main body, in which the first edge is opposite the second edge. The main body is configured to enter an opening of the U-type rail of the fastening structure such that three sides of the quadrilateral rail are coupled to the U-type rail. The positioning hole is configured to enable a protruding element to pass therethrough.

16 Claims, 7 Drawing Sheets

(56) References Cited

U.S. PATENT DOCUMENTS

| | | | |
|---|---|---|---|
| 11,555,513 B2* | 1/2023 | Tsorng | F16M 13/02 |
| 2019/0322223 A1* | 10/2019 | Hancock | F16B 2/08 |
| 2023/0058844 A1* | 2/2023 | Schofield | E01F 15/0461 |
| 2025/0060069 A1* | 2/2025 | Brants | F16M 13/02 |

* cited by examiner

MULTI-MOUNT ASSEMBLY AND ELECTRONIC APPARATUS

RELATED APPLICATIONS

This application claims priority to U.S. Provisional Application Ser. No. 63/364,498, filed May 11, 2022, which is herein incorporated by reference.

BACK GROUND

Field of Invention

The present disclosure relates to a multi-mount assembly and an electronic apparatus having the multi-mount assembly.

Description of Related Art

With the increasing advancement of technology, network products are becoming more and more diverse. Examples of network products includes wireless cards, wireless network base stations/routers, internet communication protocol set-top-boxes (IP STBs), and communication products related with Long-Term Evolution (LTE), 5G, and Wi-Fi 6. However, during the installation of network products on fixed objects (such as walls or rods), a large number of screws and components of the corresponding fixed objects are required to ensure secure mounting. This results in extra costs for consumers and manufacturers, such as those related to the time and materials associated with installation. In addition, after the products are firmly mounted, users must disassemble large numbers of screws and components to remove the products. Moreover, the mounting direction of the products is hard to alter for various installation environments. For example, rotation by 90 or 180 degrees is not possible.

SUMMARY

One aspect of the present disclosure provides a multi-mount assembly disposed on a fastening structure having a U-type rail.

According to some embodiments of the present disclosure, a multi-mount assembly includes a main body. The main body has a quadrilateral rail, a positioning hole and a passage. The positioning hole is positioned at a side of the main body facing away from a fastening structure. The passage is spatially communicated with a first edge and a second edge of the main body, in which the first edge is opposite the second edge. The main body is configured to enter an opening of the U-type rail of the fastening structure such that three sides of the quadrilateral rail are coupled with the U-type rail. The positioning hole is configured to enable a protruding element to pass therethrough.

In some embodiments, the multi-mount assembly further includes a fixing band positioned at the passage of the main body. Two ends of the fixing band respectively extend outward from the first and second edges of the main body, and the fixing band is configured to position the main body on a fixing rod.

In some embodiments, the side of the main body facing away from the fastening structure has an accommodating recess to accommodate the fixing rod.

In some embodiments, a longitudinal direction of the accommodating recess is perpendicular to a longitudinal direction of the passage.

In some embodiments, a longitudinal direction of the accommodating recess is perpendicular to a longitudinal direction of the fixing band.

In some embodiments, the side of the main body facing away from the fastening structure further includes a reinforcement rib located in the accommodating recess.

In some embodiments, the main body further has a third edge and a fourth edge opposite the third edge. Each of the first edge, the second edge, the third edge and the fourth edge has a threaded hole configured to be fastened by a screw passing through the fastening structure.

In some embodiments, a side of the main body facing toward the fastening structure further includes a reinforcement rib extending from the first edge to the second edge.

Another aspect of the present disclosure provides an electronic apparatus.

According to some embodiments of the present disclosure, an electronic apparatus includes an electronic device and a multi-mount assembly. A rear surface of the electronic device has a fastening structure having a U-type rail. The multi-mount assembly is disposed on the fastening structure including a main body. The quadrilateral rail is disposed along a periphery of the main body. A positioning hole is located at a side of the main body facing away from the fastening structure. A passage is spatially communicated with a first edge and a second edge of the main body, and the first edge is opposite the second edge. The main body is configured to enter an opening of the U-type rail of the fastening structure such that three sides of the quadrilateral rail are coupled with the U-type rail, and the positioning hole is configured to enable a protruding element to pass therethrough.

In some embodiments, the multi-mount assembly further includes a fixing band positioned in the passage of the main body. Two ends of the fixing band respectively extend outward from the first edge and the second edge of the main body, and the fixing band is configured to position the main body on a fixing rod.

In some embodiments, a side of the main body facing away from the fastening structure has an accommodating recess to accommodate the fixing rod.

In some embodiments, a longitudinal direction of the accommodating recess is perpendicular to a longitudinal direction of the passage.

In some embodiments, a longitudinal direction of the accommodating recess is perpendicular to a longitudinal direction of the fixing band.

In some embodiments, the side of the main body facing away from the fastening structure further includes a reinforcement rib located in the accommodating recess.

In some embodiments, the main body further has a third edge and a fourth edge opposite third edge. Each of the first edge, the second edge, the third edge and the fourth edge has a threaded hole configured to be fastened by a screw passing through the fastening structure.

In some embodiments, the side of the main body facing toward the fastening structure further includes a reinforcement rib extending from the first edge to the second edge.

In the aforementioned embodiments of the present disclosure, since the main body of the multi-mount assembly has the quadrilateral rail disposed along the periphery of the main body, the main body is able to enter the opening of the U-type rail when the multi-amount assembly is installed on the fastening structure having the U-type rail. With this configuration, the main body of the multi-mount assembly is able to be easily installed and dismantled from the U-type rail of the fastening structure, and the electronic device having the fastening structure is able to be installed on the quadrilateral rail of the multi-mount assembly after rotation (for example, by 90 or 180 degrees), in which it is necessary only to couple the three sides of the quadrilateral rail with the U-type rail. As a result, when the rear surface of the electronic device has the fastening structure, quick installation, quick removal, and multi-directional disposal of the electronic device are able to be accomplished by the multi-mount assembly. In addition, the positioning hole of the multi-mount assembly allows the protruding element to be passed therethrough to thereby position the electronic device. Savings in the time and material costs may be achieved by the multi-mount assembly, and moreover, the installation direction of the electronic device is able to be altered by users for different installation environments.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
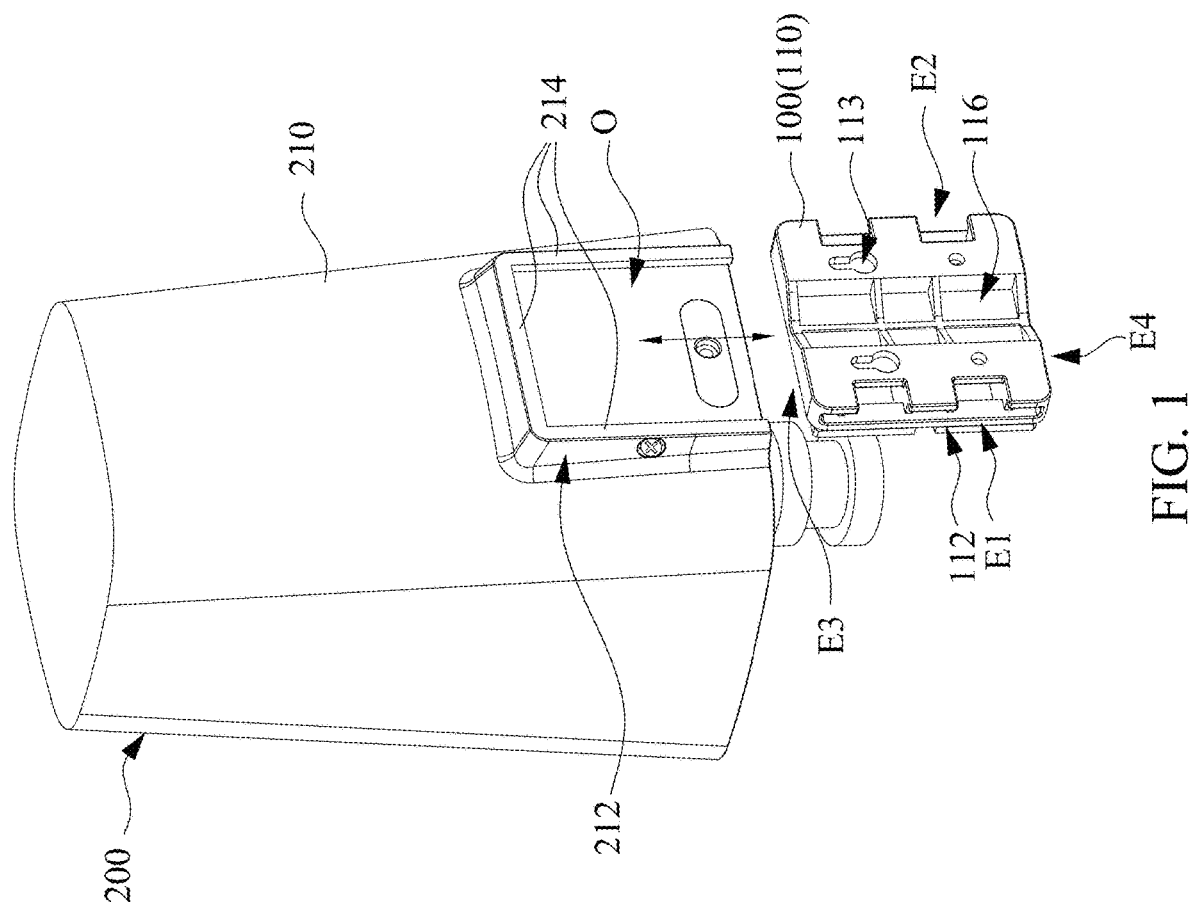
FIG. 1 is an exploded view of an electronic apparatus according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is an exploded view of an electronic apparatus 200 according to one embodiment of the present disclosure. As shown in the figure, the electronic apparatus 200 includes an electronic device 210, and a multi-mount assembly 100. A rear surface of the electronic device 210 has a fastening structure 212, and the fastening structure 212 has a U-type rail 214 enabling the multi-mount assembly 100 to be coupled with. The fastening structure 212 may be integrally formed with the rear surface of the electronic device 210, or may be fixed by using an adhesive or fastening. In some embodiments, the electronic device 210 can be a network product, such as a wireless network base station/router, an internet communication protocol set-top-box (IP STBs), and a communication product related with Long-Term Evolution (LTE), 5G, and Wi-Fi 6, but the present disclosure is not limited to this regard. In FIG. 1, the appearance of the electronic device 210 is merely an example, and other appearance designs are acceptable as long as the rear surface of the electronic device 210 has the fastening structure 212.

In the disclosure to follow, the structure of the multi-mount assembly 100 will be explained in detail.

Figure 2:
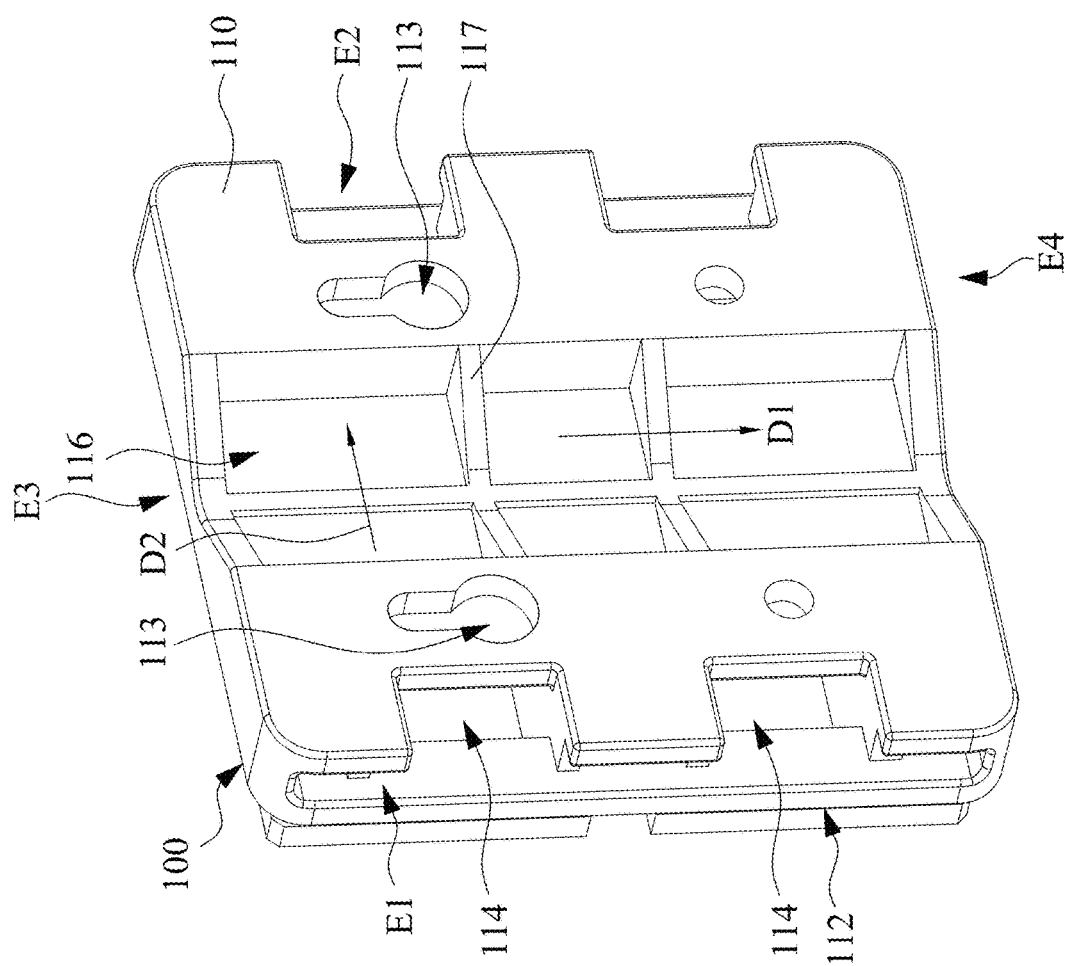
FIG. 2 is a 3D view of a multi-mount assembly of FIG. 1.
Figure 3:
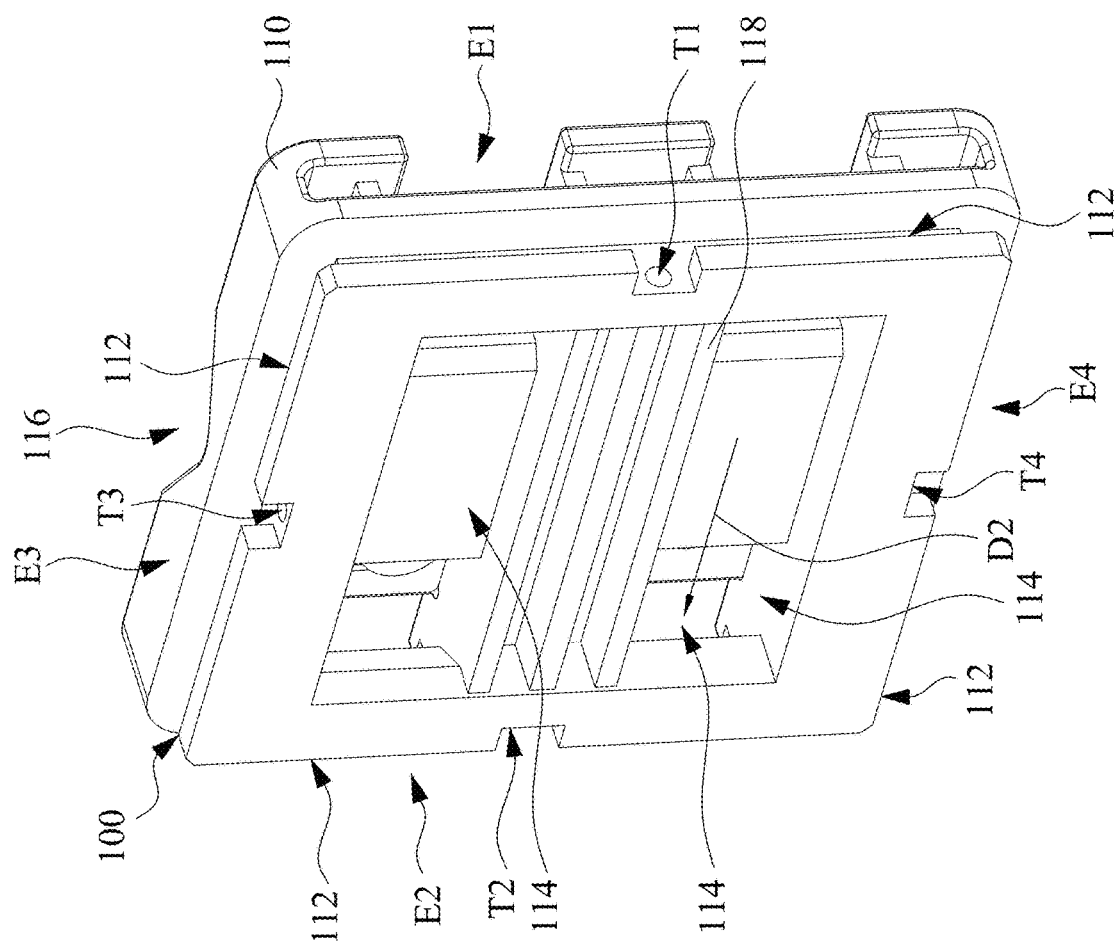
FIG. 3 is another 3D view of the multi-mount assembly of FIG. 2.

FIG. 2 is a 3D view of the multi-mount assembly 100 of FIG. 1. FIG. 3 is another 3D view of the multi-mount assembly of FIG. 2. As shown in FIG. 2 and FIG. 3, the multi-mount assembly 100 includes a main body 110. The main body 110 includes a quadrilateral rail 112, a positioning hole 113, and a passage 114. The quadrilateral rail 112 is disposed along a periphery of the main body 110. In other words, the quadrilateral rail 112 encloses the main body 110. The positioning hole 113 is positioned at a side of the main body 110 facing away from the fastening structure 212 (see FIG. 1). When the multi-mount assembly 100 is installed on a planar support (such as a wall), a protruding element P fixed on the support is able to pass through the positioning hole 113 (which will be explained with reference to FIG. 5), such that the main body 110 of the multi-mount assembly 100 is disposed on the wall. In addition, the passage 114 spatially communicates with a first edge E1 and a second edge E2 of the main body 110, in which the first edge E1 is opposite the second edge E2. When the multi-mount assembly 100 is installed on a bar support (such as a fixing rod), a fixing band may extend through the passage 114 from one of the first edge E1 and the second edge E2 of the main body 110, and out through the other of the first edge E1 and the second edge E2 of the main body (which will be explained with reference to FIG. 6 and FIG. 7), such that two ends of the fixing band are able to wrap around the fixing rod and thereby dispose the main body 110 of the multi-mount assembly 100 on the fixing rod.

As shown in FIG. 1 and FIG. 3, the main body 110 of the multi-mount assembly 100 is able to enter an opening O of the U-type rail 214 of the fastening structure 212, such that three sides of the quadrilateral rail 112 are coupled with the U-type rail 214. In this disclosure, "couple" means "fasten".

During installation, the main body 110 is able to be fixed on the protruding element P of the support (such as a wall W shown in FIG. 5) by the fixing hole 113, and afterward an installation direction of the electronic device 210 is determined according to the installation environment, in which the opening O of the U-type rail 214 of the electronic device 210 faces toward one of the first edge E1, second edge E2, third edge E3, and fourth edge E4 of the main body 110, and then is pressed into the quadrilateral rail 112 to couple the U-type rail 214 with three sides of the quadrilateral rail 112. For instance, the opening O of the U-type rail 214 of the electronic device 210 in FIG. 1 can face the third edge E3, and then may be pressed into the quadrilateral rail 112, in which the quadrilateral rail 112 at the side of the first edge E1, second edge E2, and third edge E3 is coupled with the U-type rail 214. This would be the state of FIG. 1 after assembly.

In other embodiments, the electronic device 210 in FIG. 1 can rotate 180 degrees so that the opening O of the U-type rail 214 of the electronic device 210 faces the fourth edge E4 of the main body 110, and then may be pressed upon into the quadrilateral rail 112, in which the quadrilateral rail 112 at the side of the first edge E1, second edge E2, and third edge E3 is coupled with the U-type rail 214. In another example, the electronic device 210 can rotate 90 degrees left so that the opening O of the U-type rail 214 of the electronic device 210 faces the first edge E1 of the main body 110, and then may be pressed right into the quadrilateral rail 112, in which the quadrilateral rail 112 at the side of the third edge E3, fourth edge E4, and first edge E1 is coupled with the U-type rail 214. In yet another example, the electronic device 210 in FIG. 210 can rotate 90 degrees right so that the opening O of the U-type rail 214 of the electronic device 210 faces the second edge E2 of the main body 110, and then may be pressed left into the quadrilateral rail 112, in which the quadrilateral rail 112 at the side of the third edge E3, fourth edge E4, and second edge E2 is coupled with the U-type rail 214.

Specifically, since the main body 110 of the multi-mount assembly 100 has the quadrilateral rail 112 disposed along the periphery of the main body 110, the main body 110 is able to enter the opening O of the U-type rail 214 and couples three sides of the quadrilateral rail 112 with the U-type rail 214 when the multi-mount assembly 100 is installed on the fastening structure 212 having the U-type rail 214. With this configuration, the main body 110 of the multi-mount assembly 100 is able to be installed on and dismantled from the U-type rail 214 of the fastening structure 212, and the electronic device 210 having the fastening structure 212 is able to be installed on the quadrilateral rail 112 of the multi-mount assembly 100 after rotation (for example, by 90 degrees or 180 degrees), in which it is necessary only to couple the three sides of the quadrilateral rail 112 with the U-type rail 214. As a result, when the rear surface of the electronic device 210 has the fastening structure 212, quick installation, quick removal, and multi-directional disposal of the electronic device 210 are able to be accomplished by the multi-mount assembly 100. In addition, the positioning hole 113 of the multi-mount assembly 100 allows the protruding element P to be passed therethrough to thereby position the electronic device 210 (See FIG. 5). Savings in time and material costs may be achieved by the multi-mount assembly 100, and moreover, the installation direction of the electronic device 210 is able to be altered by users for different installation environments.

As shown in FIG. 2 and FIG. 3, in this embodiment, the side of the main body 110 facing away from the fastening structure 212 has an accommodating recess 116. The accommodating recess 116 is configured to accommodate the fixing rod (which will be explained with reference to FIGS. 6 and 7). A longitudinal direction D1 of the accommodating recess 116 is perpendicular to a longitudinal direction D2 of the passage 114. In greater detail, the longitudinal direction D1 of the accommodating recess 116 can be the direction from the third edge E3 to the fourth edge E4, and the longitudinal direction D2 of the passage 114 can be the direction from the first edge E1 to the second edge E2. In addition, sides of the main body 110 facing away from and toward the fastening structure 212 respectively include reinforcement ribs 117 and 118. The reinforcement rib 117 is positioned in the accommodating recess 116. The reinforcement rib 118 extends from the first edge E1 to the second edge E2, and may define a longitudinal side of the passage 114 and may divide the passage 114 into upper and lower portions. The reinforcement ribs 117 and 118 can further improve structural strength of the main body 110 of the multi-mount assembly 100.

Figure 4:
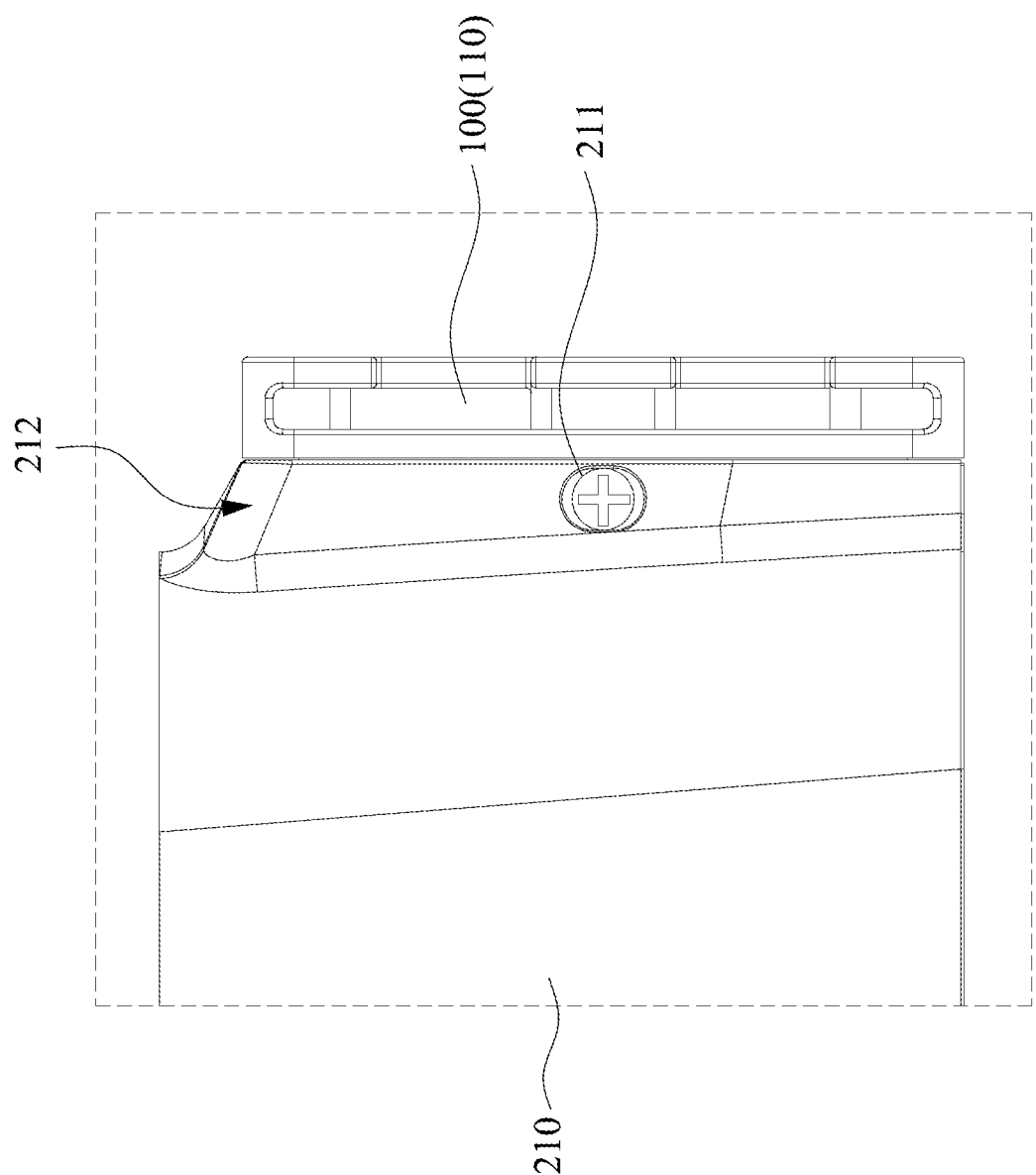
FIG. 4 is a partial enlarged view of the multi-mount assembly of FIG. 1, in which the multi-mount assembly is fixed on a fastening structure of the electronic device by a screw.

FIG. 4 is a partially enlarged view of the multi-mount assembly 100 of FIG. 1, in which the multi-mount assembly 100 is fixed on the fastening structure 212 of the electronic device 210 by a screw 211. As shown in FIG. 3 and FIG. 4, the main body 110 of the multi-mount assembly 100 can further have threaded holes T1, T2, T3, and T4. For example, the first edge E1 and the second edge E2 opposite the first edge E1 have the threaded holes T1 and T2 respectively, and the third edge E3 and the forth edge E4 opposite the third edge E3 have the threaded holes T3 and T4 respectively. When the multi-mount assembly 100 and the electronic device 210 of FIG. 1 are assembled, one of the threaded holes T1, T2, T3, and T4 can be fastened by the screw 211 passing through the fastening structure 212, and further enhance stability. Since the first edge E1, the second edge E2, the third edge E3, and the fourth edge E4 have the threaded holes T1, T2, T3, and T4, respectively, no matter how the electronic device 210 of FIG. 1 rotates and couples with the three sides of the quadrilateral rail 112 of the multi-mount assembly 100 by the U-type rail 214 (shown in FIG. 1), the screw 211 can be fastened in one of the threaded holes T1, T2, T3, and T4.

It is to be noted that the connection relationships and advantages of the elements described above will not be repeated in the following description. In the following description, an example of the electronic device 210 fixed on the support by the multi-mount assembly 100 will be explained.

Figure 5:
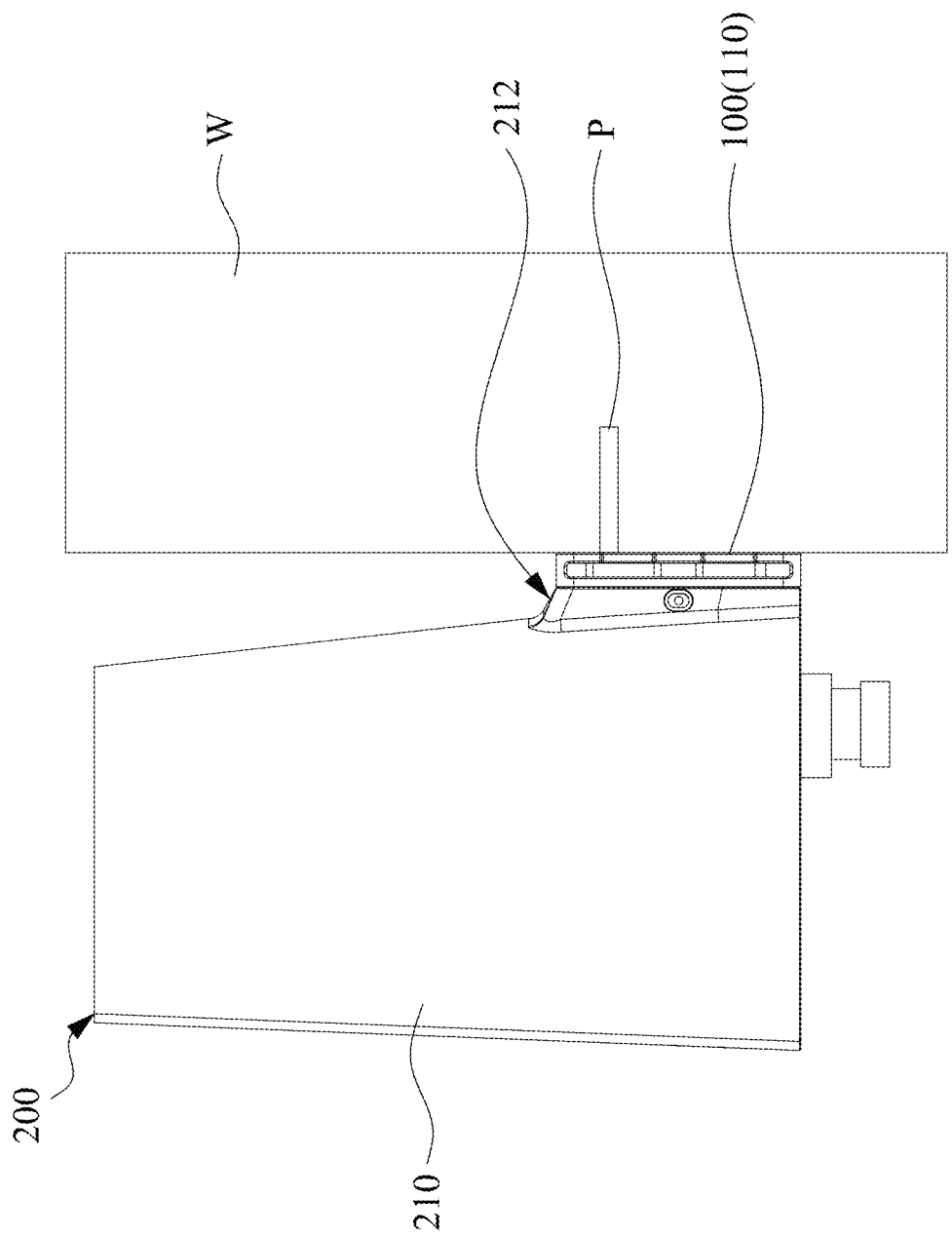
FIG. 5 is a side view of the electronic device of FIG. 1, in which the electronic device is fixed on a wall.

FIG. 5 is a side view of the electronic device 210 of FIG. 1, in which the electronic device 210 is fixed on a wall W by the multi-mount assembly 100. As shown in FIGS. 1 and 5, the positioning hole 113 is positioned at the side of the main body 110 facing away from the fastening structure 212. The positioning hole 113 can be gourd-shaped with a narrow upper part and a wide lower part but the present disclosure is not limited to this regard. The protruding element P (e.g., a screw or a bolt) is fixed on the wall W. During installation, the multi-mount assembly 100 can couple with the fastening structure 212 of the electronic device 210, then approach to the wall W together to fix the electronic apparatus 200 on the wall W by passing the protruding element P through the positioning hole 113 of the main body 110. In other embodiments, the multi-mount assembly 100 can approach the wall W to pass the protruding element P through the positioning hole 113 of the main body 110, then couple with the fastening structure 212 of the electronic device 210 to dispose the electronic apparatus 200 on the wall W. The coupling between the fastening structure 212 and the multi-mount assembly 100 has been described above and will not be explained again. In addition, the configuration of the screw 211 of FIG. 4 can be applied to the embodiments of FIG. 5.

Figure 6:
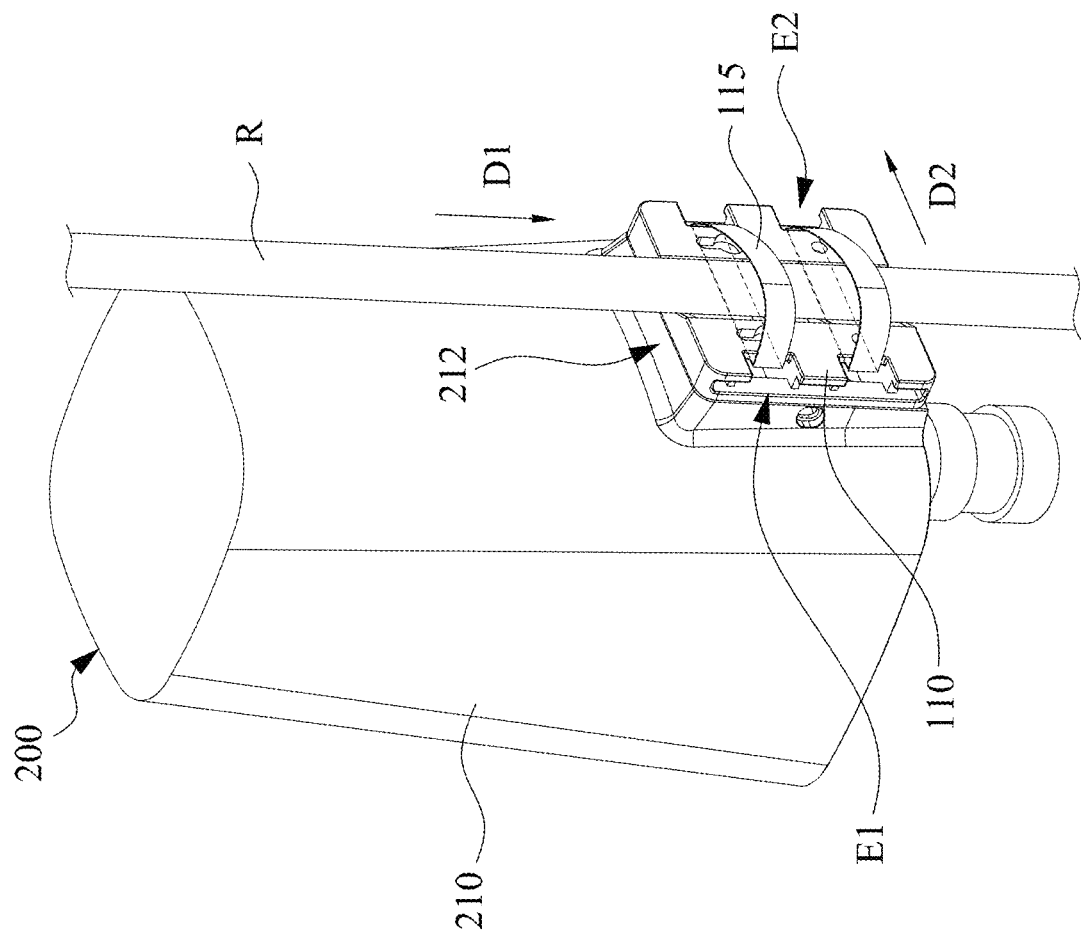
FIG. 6 is a 3D view of the electronic device of FIG. 1, in which the electronic device is fixed on a longitudinal fixing rod.

FIG. 6 is a 3D view of the electronic device 210 of FIG. 1, in which the electronic device 210 is fixed on the longitudinal fixing rod R by the multi-mount assembly 100. As shown in FIG. 3 and FIG. 6, the multi-mount assembly 100 further includes the fixing band 115. The fixing band 115 is positioned in the passage 114 of the main body 110. Two ends of the fixing band 115 respectively extend outward from the first edge E1 and the second edge E2 of the main body 110. In some embodiments, the fixing band 115 can be similar in structure to a cable tie. When the accommodating recess 116 (also shown in FIG. 2) accommodates a portion of the fixing rod R, the two ends of the fixing band 115 can wrap around the longitudinal fixing rod R to position the main body 110 on the fixing rod R. In addition, the longitudinal direction D1 of the accommodating recess 116 is perpendicular to the longitudinal direction D2 of the fixing band to facilitate wrapping of the fixing band 115 around the fixing rod R.

During installation, the accommodating recess 116 of the main body 110 of the multi-mount assembly 100 can be rotated to the longitudinal direction, and then the multi-mount assembly 100 may be coupled with the fastening structure 212 of the electronic device 210. Afterward, the multi-mount assembly 100 and the electronic device 210 are moved toward the longitudinal fixing rod R together to accommodate a portion of the fixing rod R in the accommodating recess 116, after which the fixing rod R is positioned by the fixing band 115. Alternatively, during installation, the accommodating access 116 of the main body 110 of the multi-mount assembly 100 can be rotated to the longitudinal direction, then moved toward the fixing rod R to accommodate a portion of the longitudinal fixing rod R in the accommodating recess 116 and be positioned on the fixing rod R by the fixing band 115. Afterward, the fastening structure 212 of the electronic device 210 can be coupled with the main body 110.

Figure 7:
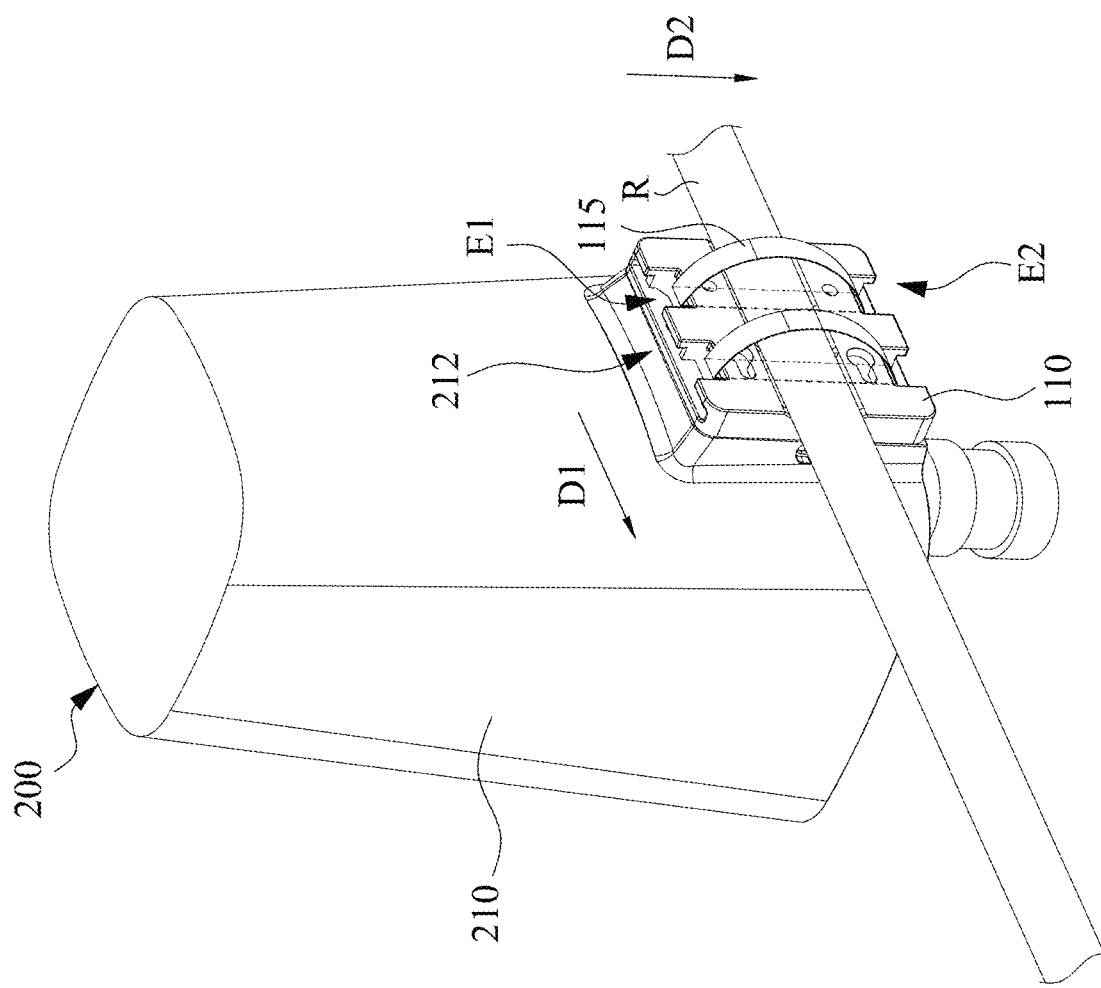
FIG. 7 is a 3D view of the electronic device of FIG. 1, in which the electronic device is fixed on a transverse fixing rod.

FIG. 7 is a 3D view of the electronic device 210 of FIG. 1, in which the electronic device 210 is fixed on the transverse fixing rod R by the multi-mount assembly 100. As shown in FIG. 3 and FIG. 6, the multi-mount assembly 100 includes the fixing band 115 positioned in the passage 114 of the main body 110. The two ends of the fixing band 115 extend respectively from the first edge E1 and the second edge E2 of the main body 110. The difference between this embodiment and the embodiment of FIG. 6 is that the fixing rod R of FIG. 7 is transverse, and the main body 110 of the multi-mount assembly 100 is rotated 90 degrees compared to that in FIG. 6. The electronic device 210 of FIG. 7 maintains the same installation direction as in FIG. 6. The mechanism of multi-directional coupling between the electronic device 210 and the multi-mount assembly 100 has been described above and will not be explained again.

During installation, the accommodating recess 116 of the main body 110 of the multi-mount assembly 100 (also shown in FIG. 2) can be rotated to the transverse direction, and then the multi-mount assembly 100 may be coupled with the fastening structure 212 of the electronic device 210. Afterward, the multi-mount assembly 100 and the electronic device 210 are moved toward the transverse fixing rod R together to accommodate a portion of the fixing rod R in the accommodating recess 116, after which the multi-mount assembly 100 and the electronic device 210 are positioned on the fixing rod R by the fixing band 115. Alternatively, during installation, the accommodating recess 116 of the main body 110 of the multi-mount assembly 100 (also shown in FIG. 2) can be rotated to the transverse direction, then moved toward the transverse fixing rod R to accommodate a portion of the fixing rod R in the accommodating access 116, and be positioned on the fixing rod R by the fixing band 115. Afterward, the fastening structure 212 of the electronic device 210 can be coupled with the main body 110.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A multi-mount assembly disposed on a fastening structure having a U-type rail, the multi-mount assembly comprising:
a main body having a quadrilateral rail, a positioning hole, and a passage, wherein the quadrilateral rail is disposed along a periphery of the main body, the positioning hole is located at a side of the main body facing away from the fastening structure, the passage is spatially communicated with a first edge and a second edge of the main body, and the first edge is opposite the second edge, and wherein the main body is configured to enter an opening of the U-type rail of the fastening structure, the quadrilateral rail comprises a first set of three sides configured to couple with the U-type rail and a second set of three sides configured to couple with the U-type rail, wherein the first set of three sides are different from the second set of three sides, and the positioning hole is configured to enable a protruding element to pass therethrough.

2. The multi-mount assembly of claim 1, further comprising:
a fixing band positioned in the passage of the main body, wherein two ends of the fixing band respectively extend outward from the first edge and the second edge of the main body, and the fixing band is configured to position the main body on a fixing rod.

3. The multi-mount assembly of claim 2, wherein the side of the main body facing away from the fastening structure has an accommodating recess to accommodate the fixing rod.

4. The multi-mount assembly of claim 3, wherein a longitudinal direction of the accommodating recess is perpendicular to a longitudinal direction of the passage.

5. The multi-mount assembly of claim 3, wherein a longitudinal direction of the accommodating recess is perpendicular to a longitudinal direction of the fixing band.

6. The multi-mount assembly of claim 3, wherein the side of the main body facing away from the fastening structure further comprises a reinforcement rib located in the accommodating recess.

7. The multi-mount assembly of claim 1, wherein the main body further has a third edge and a fourth edge opposite the third edge, and each of the first edge, the second edge, the third edge and the fourth edge has a threaded hole configured to be fastened by a screw passing through the fastening structure.

8. The multi-mount assembly of claim 7, wherein a side of the main body facing toward the fastening structure further comprises a reinforcement rib extending from the first edge to the second edge.

9. An electronic apparatus, comprising:
an electronic device having a fastening structure on a rear surface of the electronic device, wherein the fastening structure has a U-type rail; and
a multi-mount assembly disposed on the fastening structure, the multi-mount assembly comprises a main body having a quadrilateral rail, a positioning hole, and a passage, wherein the quadrilateral rail is disposed along a periphery of the main body, the positioning hole is located at a side of the main body facing away from the fastening structure, the passage is spatially communicated with a first edge and a second edge of the main body, and the first edge opposite the second edge, and wherein the main body is configured to enter an opening of the U-type rail of the fastening structure, the quadrilateral rail comprises a first set of three sides configured to couple with the U-type rail and a second set of three sides configured to couple with the U-type rail, wherein the first set of three sides are different from the second set of three sides, and the positioning hole is configured to enable a protruding element to pass therethrough.

10. The electronic apparatus of claim 9, wherein the multi-mount assembly further comprises:

a fixing band positioned in the passage of the main body, wherein two ends of the fixing band respectively extend outward from the first edge and the second edge of the main body, and the fixing band is configured to position the main body on a fixing rod.

11. The electronic apparatus of claim 10, wherein the side of the main body facing away from the fastening structure has an accommodating recess to accommodate the fixing rod.

12. The electronic apparatus of claim 11, wherein a longitudinal direction of the accommodating recess is perpendicular to a longitudinal direction of the passage.

13. The electronic apparatus of claim 11, wherein a longitudinal direction of the accommodating recess is perpendicular to a longitudinal direction of the fixing band.

14. The electronic apparatus of claim 11, wherein the side of the main body facing away from the fastening structure further comprises a reinforcement rib located in the accommodating recess.

15. The electronic apparatus of claim 9, wherein the main body further has a third edge and a fourth edge opposite third edge, and each of the first edge, the second edge, the third edge and the fourth edge has a threaded hole configured to be fastened by a screw passing through the fastening structure.

16. The electronic apparatus of claim 9, wherein a side of the main body facing toward the fastening structure further comprises a reinforcement rib extending from the first edge to the second edge.

* * * * *